(12) United States Patent
Nguyen et al.

(10) Patent No.: US 7,844,260 B2
(45) Date of Patent: Nov. 30, 2010

(54) METHOD AND SYSTEM FOR PREVIEWING A MULTIMEDIA CONFERENCE

(75) Inventors: Hai D. Nguyen, Plano, TX (US); Venky Raju, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1118 days.

(21) Appl. No.: 11/530,296

(22) Filed: Sep. 8, 2006

(65) Prior Publication Data
US 2008/0075255 A1 Mar. 27, 2008

(51) Int. Cl.
*H04M 3/42* (2006.01)
(52) U.S. Cl. .................. 455/416; 455/518; 709/204; 370/260
(58) Field of Classification Search .............. 455/416, 455/518; 709/204; 370/260
See application file for complete search history.

(56) References Cited

U.S. PATENT DOCUMENTS

| 2003/0065802 A1* | 4/2003 | Vitikainen et al. ......... 709/231 |
| 2007/0097886 A1* | 5/2007 | Schwagmann et al. ...... 370/260 |
| 2007/0100981 A1* | 5/2007 | Adamczyk et al. .......... 709/223 |
| 2007/0156811 A1* | 7/2007 | Jain et al. ................... 709/204 |

\* cited by examiner

*Primary Examiner*—Creighton Smith

(57) ABSTRACT

A method and system for previewing a multimedia conference are disclosed. As one example, the method comprises the steps of recording a conference preview message, storing the conference preview message, assigning an address to the conference preview message, selecting a plurality of invitees for the multimedia conference, preparing an invitation message, the invitation message including the address, sending the invitation message to the plurality of invitees, at least one invitee of the plurality of invitees retrieving the conference preview message using the address, and displaying the conference preview message for the at least one invitee.

20 Claims, 2 Drawing Sheets

US 7,844,260 B2

METHOD AND SYSTEM FOR PREVIEWING A MULTIMEDIA CONFERENCE

CROSS-REFERENCE TO RELATED APPLICATIONS

The present application is related to U.S. patent application Ser. No. 11/336,528, entitled "INSTANT CONFERENCE METHOD AND APPARATUS," filed on Jan. 20, 2006, which is assigned to the assignee of the present application. The subject matter disclosed in U.S. patent application Ser. No. 11/336,528 is incorporated by reference into the present application as if fully set forth herein.

FIELD OF THE INVENTION

The present invention is related to the telecommunications field, and more particularly, but not exclusively, to a method and system for previewing a multimedia conference.

BACKGROUND OF THE INVENTION

In the next generation of telecommunication networks, multimedia conferencing is considered to be one of the most promising network services provided. A type of multimedia conferencing is the Instant Conference. An Instant Conference is a voice conference call or video conference in which an organizer selects a list of participants and/or conference groups from an address book or contact list, and establishes a conference with the selected invitees and/or group members with a single input. For example, Instant Conference techniques that facilitate the initiation and maintenance of video conferences or voice conference calls are disclosed in U.S. patent application Ser. No. 11/336,528. The disclosed techniques enable an organizer to establish (virtually instantly) a video conference or voice conference call with a list of participants by pressing a button, speaking a suitable command, or using another simple input technique. Thus, an Instant Conference significantly reduces conferencing set-up complexity and time.

Notwithstanding the numerous advantages of the above-described Instant Conference techniques, a significant problem still exists with respect to the initiation of Instant Conferences. Upon receiving an invitation to an Instant Conference (e.g., phone call), without responding to the invitation, the invitees are unable to determine (1) that they are being invited to a conference, (2) the identity of the organizer, or (3) the purpose of the conference. For example, existing Instant Conference initiation techniques require the invitees to respond to an invitation (e.g., answer the telephone), and then talk with the organizer to determine the purpose of the conference. In other words, invitees are currently unable to preview an invitation to an Instant Conference (or other multimedia conference), so that they can decide upfront whether or not to accept, reject or disregard the invitation.

SUMMARY OF THE INVENTION

In one example embodiment, a method is provided for previewing a multimedia conference. The method comprises the steps of recording a conference preview message, storing the conference preview message, assigning an address to the conference preview message, selecting a plurality of invitees for the multimedia conference, preparing an invitation message, the invitation message including the address, sending the invitation message to the plurality of invitees, at least one invitee of the plurality of invitees retrieving the conference preview message using the address, and displaying the conference preview message for the at least one invitee.

In a second example embodiment, a method is provided for previewing a multimedia conference. The method comprises the steps of recording a conference preview message, selecting a plurality of invitees for the multimedia conference, selecting a plurality of invitees for the multimedia conference, sending the invitation message to the plurality of invitees, and displaying the conference preview message for at least one invitee of the plurality of invitees.

In a third example embodiment, a system is provided for previewing a multimedia conference. The system comprises a first multimedia communication device operable to record a conference preview message, and select a plurality of invitees for the multimedia conference, a data storage device operable to store the recorded conference preview message and associate an address with the stored conference preview message, a processing unit operable to send an invitation message to the plurality of invitees, the invitation message including the address, and a plurality of multimedia communication devices associated with the plurality of invitees, at least one multimedia communication device of the plurality of multimedia communication devices operable to receive the invitation message, retrieve the conference preview message using the address, and display the conference preview message for an invitee associated with the at least one communication device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
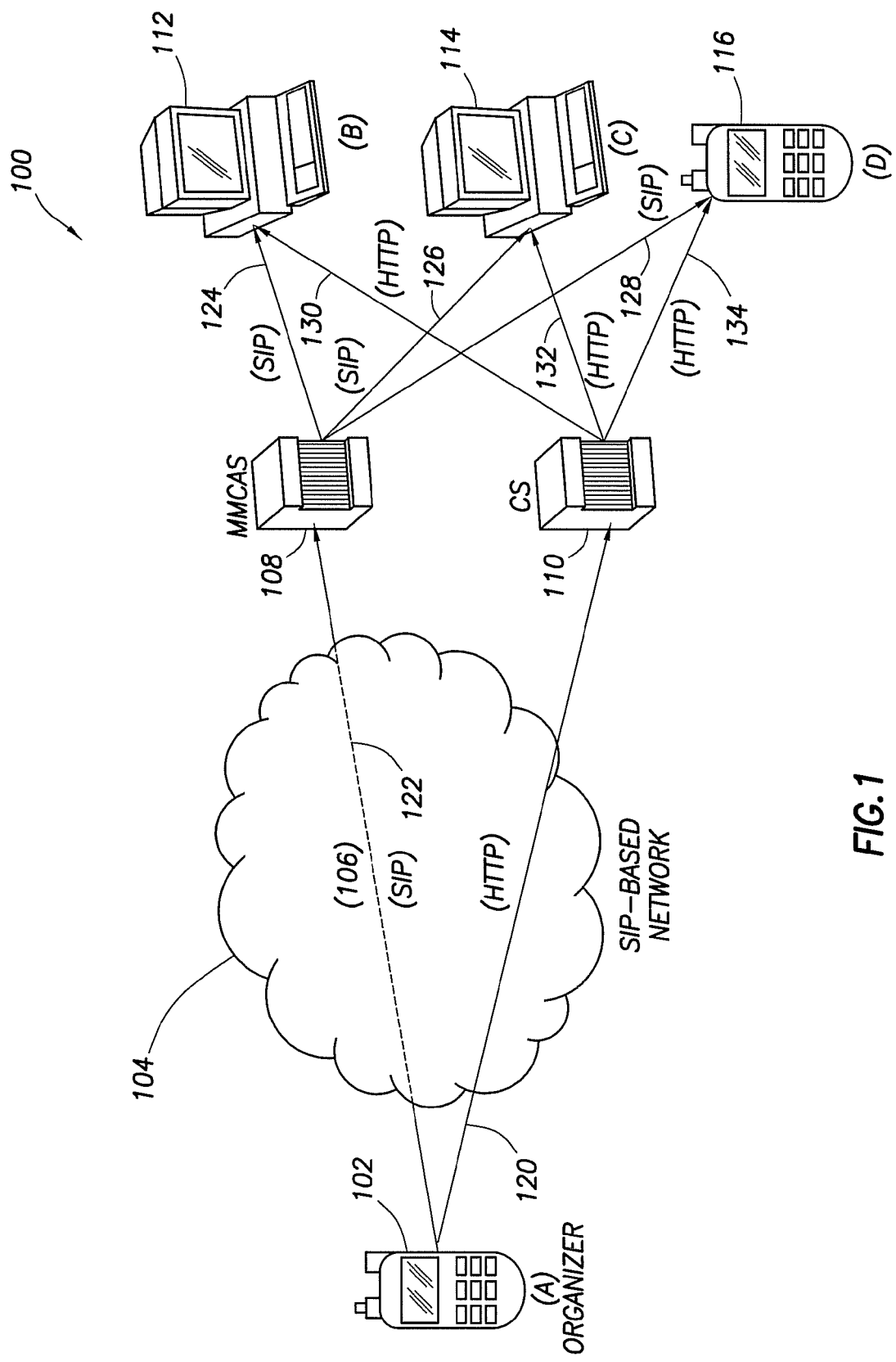
FIG. 1 depicts a system for previewing a multimedia conference, which can be used to implement an example embodiment of the present invention.

With reference now to the figures, FIG. 1 depicts a system 100 for previewing a multimedia conference, which can be used to implement an example embodiment of the present invention. For this example embodiment, system 100 includes a mobile handset or phone (or similar device) 102, which can be used by an organizer to initiate a multimedia conference. Mobile phone 102 is a multimedia phone, which includes (among other things) video and audio recorder components. Thus, the organizer may record a video/audio message using mobile phone 102. For this example embodiment, the multimedia conference to be initiated is an Instant Conference. However, the scope of coverage of the present invention is not intended to be limited only to Instant Conferences, and can include any other suitable type of multimedia conference (e.g., voice conference, video conference, conference using one or more multimedia phones, etc.).

The organizer's mobile phone 102 is connected (e.g., via a suitable cellular network) to a network 104, which is operated in accordance with the Session Initiation Protocol (SIP). For example, the SIP-based network 104 may be a next generation network (NGN) architecture for mobile and fixed multimedia services. One example of such a SIP-based network is the Internet Protocol (IP) Multimedia Subsystem (IMS). However, it is important to note that network 104 is not intended to be so limited and can be implemented with any suitable type of SIP-based network.

For multimedia conferencing, mobile phone 102 is connected for communications with a suitable SIP-based server 106 (not shown) in SIP-based network 104 via communication link 122. Server 106 performs a primary SIP signaling function in SIP-based network 104, which provides control and routing functions for IP sessions. As such, server 106 can be composed of one or more SIP-based servers that process the SIP signaling in SIP-based network 104. In any event, it should be understood that mobile phone 102 can communicate with SIP-based network 104 using SIP signaling.

For this example embodiment, SIP-based server 106 is connected for communications to an application server 108 (e.g., a Multimedia Conferencing Application Server or MMCAS) outside of SIP-based network 104 via communication link 122. For example, the application server 108 can be an MMCAS in an IMS network, which hosts and executes services, and interfaces with SIP-based server 106 using the SIP. A primary function of application server 108 is to provide conference call services, such as, for example, services associated with the automatic initiation or set up of voice conference calls or video conferences. As such, a function of application server 108 is to invite intended participants to a multimedia conference. For example, application server 108 can automatically initiate or set up a multimedia conference (e.g., Instant Conference) between an organizer using mobile phone 102 and a number of invitees using a plurality of multimedia, fixed and/or mobile phones/terminals 112, 114 and 116 via communication links 124, 126 and 128, respectively. Communication link 122 is a SIP link that is capable of conveying messages using the SIP ("SIP messages").

In one embodiment, phones 112 and 114 may be SIP-based phones and/or terminals, and phones 102 and 116 may be cellular or mobile radiotelephones. In a different embodiment, one or more of phones 102, 112, 114 or 116 may be a Web-enabled phone or terminal, an IMS phone, a SIP landline phone or terminal, a SIP mobile phone or terminal, a soft phone or terminal (e.g., primarily software-based or computer-based phone), etc. In other words, phones 102, 112, 114 and 116 may be implemented with any suitable communication device(s) capable of initiating and conducting multimedia conferences between different participants via the Internet and/or one or more fixed or mobile phone networks. As another example, each phone or terminal 112, 114 and 116 may have a unique IP address.

For this example embodiment, mobile phone 102 is also connected for communications with a Content Server (CS) 110 outside of SIP-based network 104 via communication link 120. CS 110 is a repository for multimedia data, which allows users to process and work with the content involved. In this case, CS 110 stores and maintains (among other things) multimedia conference preview messages and respective Uniform Resource Locators (URLs) associated with the stored preview messages. Phones 112, 114 and 116 are connected for communications to CS 110 via communication links 130, 132 and 134, respectively. As such, communication links 120, 130, 132 and 134 are capable of conveying data between CS 110 and phones 112, 114 and 116 using the Hypertext Transfer Protocol (HTTP).

Figure 2:
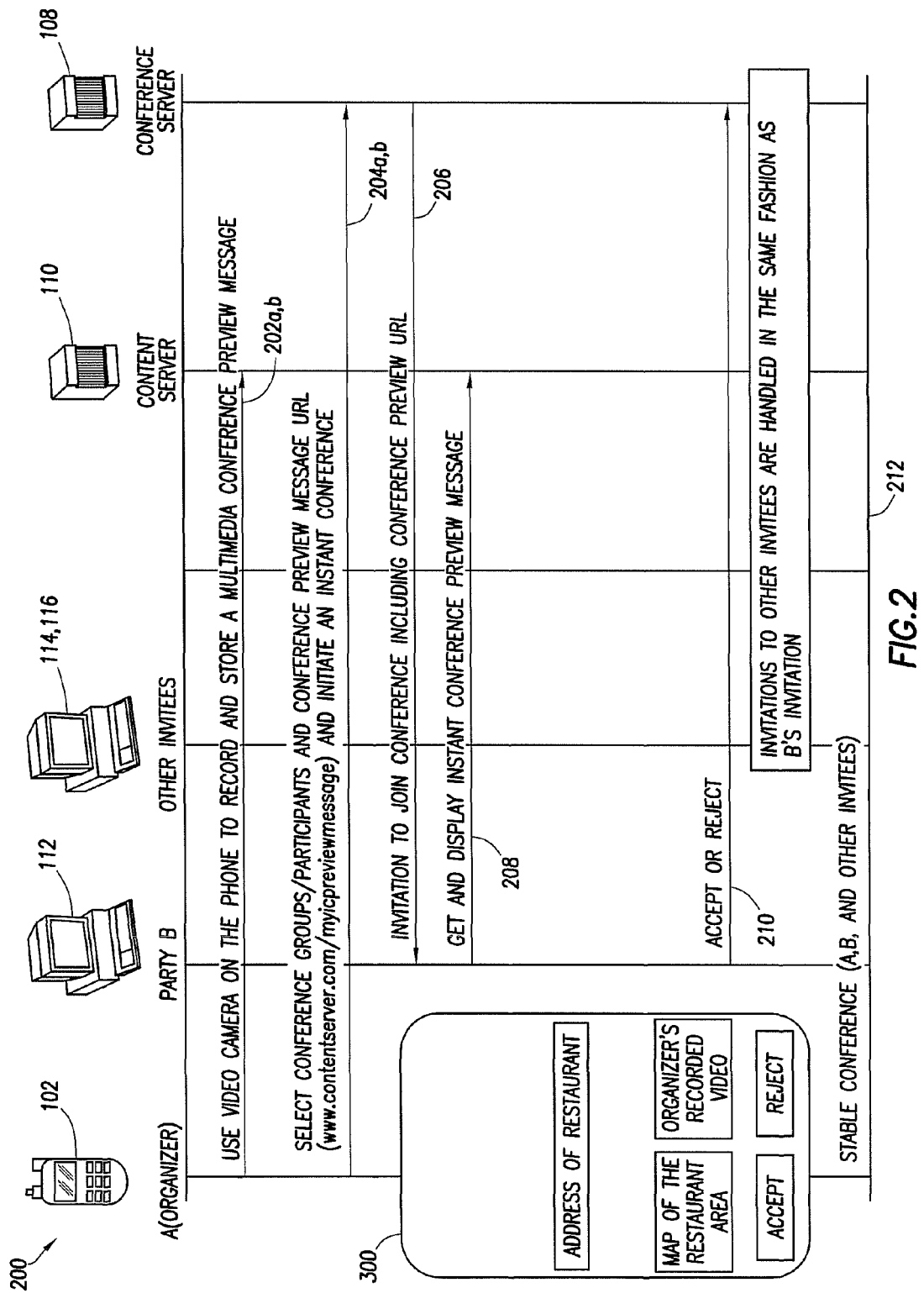
FIG. 2 is a sequence diagram that depicts a method for previewing a multimedia conference, which can be used to implement an example embodiment of the present invention.

FIG. 2 is a sequence diagram that depicts a method 200 for previewing a multimedia conference, which can be used to implement an example embodiment of the present invention. Essentially, method 200 enables conference invitees to review a multimedia preview message from a conference organizer that describes the conference and its purpose. Consequently, method 200 allows the invitees to preview the conference and decide upfront whether or not to accept, reject or disregard the invitation.

Referring now to FIGS. 1 and 2, it may be assumed that a multimedia conference (e.g., an Instant Conference) may be initiated and conducted using one or more of the methods and systems disclosed in the above-described U.S. patent application Ser. No. 11/336,528. For illustrative purposes only, the example sequence diagram depicted in FIG. 2 describes how a conference organizer (A) may invite three associates (B, C, D) to join the organizer for lunch at a particular restaurant. Also, for illustrative purposes only, the multimedia conference may be initiated and conducted using the components of SIP-based network 104. However, it should be understood that the present invention is not intended to be so limited and can be implemented using the components of any suitable communication network capable of providing an interface between a number of invitees (two or more individuals) using mobile phones and/or the Internet for any suitable purpose.

For this example embodiment, prior to contacting the intended invitees, method 200 begins with a conference organizer (A) recording and storing a multimedia conference preview message using the internal video camera components of multimedia phone 102 (step 202a). Among other things, the recorded message describes the purpose of the intended conference. In this case, the organizer (A) intends to hold the conference in order to invite associates B, C and D to join organizer A at a particular restaurant for lunch that day at a particular time. For the convenience of associates B, C and D, organizer A also includes in the stored conference preview message certain textual information including the restaurant's address, and an attached file including a map of the local area surrounding the restaurant. The map attachment may include textual information describing driving directions to the restaurant. Responsive to a suitable input instruction from organizer A (e.g., pressing a button), mobile phone 102 sends the conference preview message information to CS 110, which stores the conference preview message and associates the storage area for that message with a unique URL (step 202b). An example URL for such a conference preview message may be "(www.contentserver.com/myicpreview-message)" or other similar content. Notably, although a URL is associated with the storage location of the conference preview message in this embodiment, a different embodiment may use another type of storage location address (e.g., server address, memory address, etc.). In any event, for this example embodiment, the conference preview message may be conveyed from mobile phone 102 to CS 110 in a message using the HTTP ("HTTP message").

Next, organizer A inputs suitable instructions to phone 102, which enables organizer A to select associates B, C and D from a list stored in mobile phone 102 (and/or stored in CS 110), and also select the URL associated with that conference preview message (step 204a). For example, organizer A might select the invitees B, C and D from a buddy list, address book, or similar list of contacts. The selection might take place by selecting an invitee from a menu on a screen of mobile phone 102, speaking the name of an invitee into a voice recognition system in mobile phone 102, or some other suitable technique. Alternatively, organizer A might manually enter the phone number of an invitee. The invitees B, C and D may also be included in a particular conference group (e.g., grouping of associates or friends). In that case, organizer A may select from that group of invitees.

For this example embodiment, mobile phone 102 retrieves the URL associated with this conference preview message from CS 110 via communication link 120 using an HTTP message. Specifically, phone 102 sends the multimedia conference preview message to CS 110, and CS 110 returns the associated URL to phone 102 in an HTTP message. Organizer A then inputs a suitable instruction to mobile phone 102 (e.g., presses a button) to initiate a multimedia conference (step 204b). In this example, the multimedia conference being initiated is an Instant Conference. As such, mobile phone 102 conveys the conference initiation instruction in a suitable SIP message to SIP-based server 106 in SIP-based network 104 via communication link 122, and SIP-based 106 forwards the SIP initiation message to application server (e.g., MMCAS) 108 via communication link 122. For this example, the SIP initiation message may be a SIP "INVITE" message. However, other communication protocols or types of messages could be used to convey a conference initiation instruction to SIP-based server 106.

Next, application server 108 forwards to each of invitees B, C and D an invitation message for the multimedia conference involved (step 206). The invitation message includes the URL of the organizer's multimedia conference preview message that is stored in CS 110. The invitation message may be conveyed from application server 108 to each of phones/terminals 112, 114 and 116 via respective communication links 124, 126 and 128 using suitable SIP messages. If the multimedia conference invitation message is for an Instant Conference, the Instant Conference invitation procedures disclosed in the above-described U.S. patent application Ser. No. 11/336,528 may be used.

In response to receiving a multimedia conference invitation message from application server 108, each of the invitees' phones/terminals 112, 114 116 retrieve and display the organizer's multimedia conference preview message stored in CS 110 (step 208). As an option, the preview message might be displayed while an invitee's phone is ringing. For this example embodiment, each phone/terminal 112, 114, 116 uses the URL included in the multimedia conference invitation message to automatically retrieve organizer A's conference preview message from CS 110 via communication links 130, 132 and 134 using respective HTTP messages. Each phone/terminal 112, 114 and 116 displays the retrieved multimedia conference preview message on a respective screen or monitor. An example of such a conference preview message display is depicted as element 300 in FIG. 2. At this point, each invitee B, C, D may view the conference preview message display 300 and decide whether or not to continue on and review the organizer's recorded message.

Returning to step 206, as another option, phone 102 may forward the entire conference invitation message directly to the invitees. For example, instead of including the URL of the conference preview message in a conference invitation message, the entire conference preview message may be embedded in a SIP message and forwarded directly to application server 108. Application server 108 would then forward that SIP message to each of the invitees' phones/terminals. Notably, in bypassing the CS, the time and resources needed to retrieve and display the conference preview messages can be significantly decreased.

If an invitee B, C or D is available to view the conference preview message display 300 (e.g., not away from the office), that invitee can view the organizer's recorded message and/or decide whether to accept, reject or disregard the invitation (step 210). In other words, the invitee may view display 300 and decide whether or not to proceed further with viewing details of the invitation, or the invitee may go ahead and view the recorded message and then decide whether or not to accept, reject or disregard the invitation. For example, the invitee may "press" the "Accept" or Reject" button of display 300. In any event, each invitee is allowed to preview the multimedia conference and decide upfront whether or not to proceed with viewing the entire invitation. Ultimately, a stable multimedia conference can be established between organizer A and any of the invitees B, C, D that accept the conference invitation (step 212).

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A method in a communication device for allowing invitees to preview a multimedia conference, comprising the steps of:

recording a conference preview message;

storing the conference preview message;

selecting a plurality of invitees for the multimedia conference;

preparing an invitation message, the invitation message including options to view the conference preview message, accept the invitation, reject the invitation, and disregard the invitation; and sending the invitation message to the plurality of invitees.

2. The method of claim 1, the stored conference preview message is included in the invitation message.

3. The method of claim 1, wherein the multimedia conference comprises an Instant Conference.

4. The method of claim 1, wherein storing the conference preview message comprises:

sending the conference preview message to a server for storage; and receiving an address to the location of the stored conference preview message, wherein the address comprises a Universal Resource Locator.

5. The method of claim 1, wherein the recording step is performed with a multimedia phone.

6. The method of claim 1, wherein the server is a content server.

7. The method of claim 1, wherein invitation message is formatted such that contents of the invitation message may be received by at least one of a multimedia phone, SIP phone, IMS phone, Web-enabled phone, soft phone, cellular phone, mobile phone, fixed phone, and a multimedia communication terminal.

8. The method of claim 1, wherein the invitation message is sent to the invitees through an application server.

9. The method of claim 1, wherein the sending step comprises sending the invitation message in a SIP message.

10. A method for allowing invitees to preview a multimedia conference, comprising the steps of:

recording a conference preview message;

selecting a plurality of invitees for the multimedia conference;

preparing an invitation message, the invitation message including the conference preview message and options to view the conference preview message, accept the invitation, reject the invitation, and disregard the invitation;

sending the invitation message to the plurality of invitees.

11. The method of claim 10, wherein the sending step comprises sending the invitation message in a SIP message.

12. The method of claim 10, wherein the invitation message is sent to the plurality of invitees through an application server.

13. A system for allowing invitees to preview a multimedia conference, comprising:
   a multimedia communication device configured to:
      record a conference preview message,
      store the conference preview message,
      select a plurality of invitees for the multimedia conference,
      prepare an invitation message, the invitation message including options to view the conference preview message, accept the invitation, reject the invitation, and disregard the invitation, and
      send the invitation message to the plurality of invitees.

14. The system of claim 13, wherein the multimedia communication device comprises a mobile phone.

15. The system of claim 13, wherein when storing the conference preview message, the multimedia communication device is further configured to send the conference preview message to a content server.

16. The system of claim 13, wherein the invitation message is sent to the plurality of invitees through an application server.

17. The system of claim 13, wherein the application server comprises a multimedia conferencing application server.

18. The system of claim 13, wherein the multimedia conference comprises an Instant Conference.

19. The system of claim 13, wherein when preparing the invitation message, the multimedia communication device is further configured to format the invitation message such that the invitation message can be received by at least one of a multimedia phone, SIP phone, IMS phone, Web-enabled phone, soft phone, cellular phone, mobile phone, fixed phone, and a multimedia communication terminal.

20. The system of claim 16, wherein the application server located outside of a SIP-based network.

* * * * *